Patented Apr. 20, 1948

2,439,852

UNITED STATES PATENT OFFICE 2,439,852

CATALYST REVIVIFICATION

Donald R. Jackson, South Charleston, W. Va., assignor to Carbide and Carbon Chemicals Corporation, a corporation of New York No Drawing. Application June 30, 1944,
Serial No. 543,051

11 Claims. (Cl. 252—241)

This invention relates to the production of diolefines by the catalytic condensation of an aliphatic alcohol with an aliphatic aldehyde, for example, butadiene from ethanol and acetaldehyde; and more especially it concerns a process for revivifying or reactivating certain catalysts effectively used in such catalytic condensation reactions after the catalysts have lost their reactivity through use.

Process for the production of diolefines by the catalytic dehydration and condensation of a lower aliphatic alcohol and an acyclic mono-aldehyde are now well known. In the copending application, Serial No. 460,120, of W. J. Toussaint and J. T. Dunn, filed September 29, 1942, now Patent No. 2,421,361, dated May 27, 1947, there is described a novel and commercially important process for producing diolefines by reacting an aliphatic aldehyde such as acetaldehyde or crotonaldehyde in the vapor phase with an aliphatic alcohol that is capable of dehydrogenation to a carbonyl compound, in contact with a catalyst of the type hereinafter described. The temperature of the diolefine forming reactions may vary from about 150° C. to about 450° C., depending upon the activity of the catalyst and the aldehyde or equivalent carbonyl compound used. With acetaldehyde and ethanol, temperatures of about 300° C. to 400° C. are preferable. The diolefine is recovered from the reaction products.

The catalysts effectively used in the above-mentioned process are selected from the group consisting of tantalum oxide, zirconium oxide, columbium oxide, and combinations of these oxides with silica. These combinations may be in the form of the silicates of tantalum, zirconium or columbium, or they may consist of silica gel promoted by or impregnated with one or more of the oxides of these metals.

Catalysts containing silica gel and an oxide of tantalum, zirconium, or columbium may be made by evaporating a mixture of the silica gel and a decomposable salt of the selected metal, and roasting the resultant product at about 250° C. to 400° C. These catalysts are outstandingly effective for catalyzing the process for the production of diolefines described in the aforesaid Patent No. 2,421,361.

While catalysts which consist of silica gel or the equivalent impregnated with one or more of the above-mentioned oxides are quite active for the production of diolefines, and particularly for the production of butadiene by the catalytic condensation of ethanol and acetaldehyde or crotonaldehyde, a considerable portion of the original activity of such a catalyst is gradually lost during an extended period of use. This loss of activity is one beyond that normally occasioned by fouling of the catalyst.

The oxides and other compounds of tantalum, zirconium, and columbium functioning as catalysts and promoters for the production of diolefines, or used to impregnate or promote a silica gel or other silicious dehydration catalyst, are not only quite expensive, but some, as in the case of tantalum oxide, are rare, and are also in great demand for other applications. Furthermore, silica gel is a comparatively expensive catalytic material. Consequently, the effective revivification of the spent catalysts represents both a financial saving and a conservation of valuable raw materials.

In most catalytic reactions of organic compounds conducted at elevated temperatures, the catalyst suffers gradual loss in activity due to the deposition of carbonaceous material thereon. The activity of the catalyst may be readily restored approximately to its original value by burning off the carbonaceous materials in well-known manner. This is true of the catalysts herein described; and in practice such catalysts are periodically reactivated by burning off the carbonaceous materials with air, preferably at temperatures around 300° C. to 500° C.

However, in the case of the aforesaid zirconium, tantalum and columbium catalytic compounds, it has been established that the renewed activity imparted to the catalysts by each successive reactivation resulting from burning off the carbonaceous material gradually becomes less and less. To illustrate, in the case of one sample of a catalyst consisting of tantalum oxide deposited on silica gel, after a long series of successive operating cycles producing butadiene from acetaldehyde and ethanol in the manner described in the aforesaid Patent No. 2,421,361 of W. J. Toussaint and J. T. Dunn, and intermittent reactivation of the spent catalyst with air at a temperature of about 300° C. to 500° C., the reactivated catalyst showed an activity of about 49% of that possessed by the fresh catalyst, under the same conditions of reactant feed rates, and reaction temperature, etc. Even after a thorough reactivation treatment of the catalyst with air and oxides of nitrogen at high temperatures in the laboratory, the activity of the catalyst was only about 55% of its original value.

Excepting where otherwise defined, the term "activity," as used in the specification and claims, is intended to refer to the production ratio of a catalyst, as measured in pounds of butadiene produced per cubic foot of catalyst per hour under a fixed set of conditions of reaction temperature, rate of feed of the reactants, and composition of the mixture of reactants.

A common method for restoring the activity of spent catalysts is by the impregnation thereof with additional fresh catalyst or reaction promoter. In the case of a catalyst of the type herein described, such as one consisting of tantalum oxide on silica gel, reimpregnation of the spent catalyst with sufficient tantalum oxide will temporarily raise the initial activity of the reimpregnated catalyst to that of the fresh catalyst; but the reimpregnated catalyst is fouled much more readily in service than is the fresh catalyst. This is exemplified in the following table. It has also been established that when a spent catalyst of the type herein described is treated with boiling concentrated solutions of acids such as hydrochloric acid or oxalic acid, and is then reimpregnated with an additional amount of the tantalum oxide or its equivalent, the original activity of the catalyst can temporarily be almost entirely restored, but the rate of fouling is appreciably greater than that for fresh catalyst. Thus, a spent catalyst of tantalum oxide on silica gel was reactivated by treatment with a boiling 18% aqueous solution of hydrochloric acid, and was then reimpregnated with tantalum oxide. After use of this reactivated catalyst in a run lasting 120 hours, involving the condensation of ethanol and acetalydehyde at 325° C., with the production of butadiene, the catalyst had an activity only about 85% of that to which a new tantalum oxide-silica gel catalyst had fallen after a similar run.

The present invention is based in important part upon applicant's discovery that spent catalysts of the type hereinbefore described, useful for the production of diolefines, may, when spent, have their catalytic activity restored to an initial value at least as high as that of a fresh catalyst, and the rate of fouling of the revivified catalyst reduced to substantially that of the fresh catalyst. This may be accomplished by treating the spent catalyst, prior to a reimpregnation thereof with a compound of tantalum, zirconium or columbium, with a dilute aqueous solution of hydrofluoric acid, preferably at around 25° C. to 35° C., or thereabouts, although treatment temperatures ranging from the freezing point to the boiling point of the acid solution may be used.

Preferably the spent catalyst, prior to the hydrofluoric acid treatment, has at least the major portion of any carbonaceous matter thereon ignited and eliminated by blowing air over the catalyst mass at temperatures between about 300° C. and about 500° C. The spent catalyst preferably is then saturated with water to insure uniform reaction with the dilute hydrofluoric acid. The acid-treated catalyst is then impregnated with an additional quantity of a compound of tantalum, zirconium or columbium and roasted to provide a revivified catalyst which may contain between 0.5% and 10% by weight of tantalum oxide, zirconium oxide or columbium oxide. Heat-decomposable compounds such as zirconium nitrate, tantalum citrate and columbium citrate may be employed.

An appreciable improvement in the catalytic activity of the spent catalyst is secured by the hydrofluoric acid treatment alone, although the initial activity of the catalyst is not fully restored by such treatment.

These are unexpected results, since hydrofluoric acid reacts readily with silica, and might be expected to destroy or injure the active surface of the silica gel. Evidently, the hydrofluoric acid exerts its principal action upon the silicious material, substantially all of the oxides of the foregoing metals remaining in the catalytic mass being revivified when acid solutions of suitable dilution are employed. Indeed, in certain instances substantially all of the hydrofluoric acid is converted to hydrofluosilicic acid. Only an extremely small amount or trace of the metal oxide is removed from the surface of the silica gel.

In treating a spent catalyst with aqueous hydrofluoric acid solutions in accordance with the invention, acid concentrations varying between about 2% and about 10% of hydrogen fluoride give quite satisfactory results, particularly when the treatment is conducted at temperatures around 25° C. to 35° C. Acid concentrations around 1% or below are less effective, both at room temperature and at temperatures as high as 100° C. Acid concentrations somewhat higher than 10% can be used, but the reaction of the hydrofluoric acid with silica at these concentrations becomes increasingly vigorous. Generally the more dilute solutions of hydrofluoric acid are employed when revivifying a spent catalyst containing a compound of zirconium or of columbium.

The length of time of the treatment of the spent catalyst with the acid solution may vary over a wide range. Sufficient time preferably is allowed for the reaction of a quantity of hydrogen fluoride amounting to approximately 5% by weight of the dry silica gel or its equivalent. Periods of treatment varying from 0.5 hour for a 10% solution of the acid to 2 hours for a 2% solution thereof have given excellent results. Generally, the spent catalyst and the acid solution are thoroughly mixed during the reactivation, especially when employing dilute acid solutions containing around 5% or less of the acid. When using the more concentrated solutions up to 10% or more, mechanical mixing of the liquid and catalyst is less important.

Following the acid treatment, the excess acid is drained from the catalyst, and the latter is thoroughly washed with water to remove as much of the hydrofluoric acid and the hydrofluosilicic acid as possible. The final wash water may possess an acidity of about 0.1% or less, calculated as hydrofluoric acid.

In view of the well-known corrosive action of hydrofluoric and hydrofluosilicic acids upon most metallic and silicious compositions, the materials of construction of the vessels used in connection with the acid treatment should be carefully selected. Articles of cypress and oak woods are useful, although those made of or lined with sterling silver are preferred. Glass vessels coated with certain vinyl resins also may be used.

The acid-treated and washed catalyst may be impregnated with an additional amount of the promoter in various ways, as by evaporating the treated catalyst with a solution of decomposable salt of tantalum, zirconium or columbium, or by dipping the catalyst in such a solution. The nitrate is an effective salt for the purpose when catalysts containing zirconium oxide are to be prepared; and the citrates and oxalates give good results in the case of catalysts containing tantalum and columbium oxides. By using an aqueous solution containing about 18% to 25% of oxalic acid, and tantalum oxalate equivalent to about 9% to 10% of tantalum oxide, between 1.5% and 2.3% of this oxide has been readily applied to the acid-treated catalyst. The reimpregnated catalyst then is roasted, usually at a temperature within the range between about 250° C. and about 400° C., to provide a useful catalyst mass. The revivified catalyst contains at least 0.1% by weight, and preferably contains 1.0% to 2.0%, of fresh catalytic oxide in addition to that originally present before revivification.

The following table sets forth the comparative results secured in a number of representative runs which serve to illustrate the unexpected properties imparted to spent catalysts by the present invention.

In obtaining the data appearing in the table, the various catalysts were tested by determining the relative production ratios (weight of butadiene produced per unit volume of catalyst per hour) at intervals over an extended period of time, secured when feeding ethanol and acetaldehyde in a three to one molar ratio at a fixed rate over a fixed weight of the catalyst maintained at 300° C. Experiment C of the table shows that, while the simple reimpregnation of spent catalyst with sufficient tantalum oxide raises the initial activity of the treated catalyst to that of the fresh catalyst (see Experiment A), the reimpregnated catalyst is fouled much more readily than fresh catalyst. As shown by Experiment D, an appreciable improvement is secured by a hydrofluoric acid treatment alone. Experiments E and F show that when, according to this invention, the spent catalyst is treated with a dilute aqueous hydrofluoric acid solution at room temperature and then is impregnated with an additional small quantity of tantalum oxide, the initial activity of the revivified catalyst is at least as high as that of fresh catalyst; and the rate of fouling during its subsequent use in the process is substantially the same as that of fresh catalyst.

TABLE

*Revivification of catalyst*

[Silica gel originally impregnated with 1.7% of $Ta_2O_5$, by weight]
TESTS AT 300° C.

| Expt. No. | Catalyst | $Ta_2O_5$ added, by Weight | Activity [1] | | | | |
|---|---|---|---|---|---|---|---|
| | | | Initial | Activity after Hrs. on Stream | | | |
| | | | | 16 | 32 | 48 | 64 |
| A | Fresh catalyst | | 100 | 95 | 89 | 84 | 79 |
| B | Spent catalyst | | 49 | 47 | 45 | 43 | 42 |
| C | Spent catalyst reimpregnated with $Ta_2O_5$ | 0.3 | 101 | 81 | 61 | | |
| D | Spent catalyst treated with 10% HF for 0.5 hr. | | 89 | 84 | 77 | 68 | 59 |
| E | Spent catalyst treated with 2% HF (Example 1)[2] and reimpregnated with $Ta_2O_5$. | 0.6 | 109 | 103 | 96 | 90 | |
| F | Spent catalyst treated with 8.8% HF (Example 2)[2] and reimpregnated with $Ta_2O_5$. | 0.8 | 113 | 106 | 97 | 89 | 81 |

[1] Initial activity of fresh catalyst=100.
[2] Examples given in this application.

The following examples serve merely to illustrate the invention. The latter is in no wise intended to be limited by such examples:

EXAMPLE I

A spent catalyst employed in the production of butadiene by the catalytic vapor phase condensation of ethanol and acetaldehyde consisted of silica gel impregnated with 1.7% tantalum oxide. The spent catalyst was reactivated by heating it at about 400° C. in a stream of air before being discharged from the converter. 185 grams of the resultant material were immersed in distilled water for one-half hour, then thoroughly drained, and immersed for two hours in 670 grams of an aqueous solution of hydrofluoric acid containing 2.1% of hydrogen fluoride. The spent acid solution was then decanted, and the acid-treated catalyst was washed by immersion for 15-minute periods in 300 gram portions of water until the wash water showed 0.06% of acid, calculated as hydrofluoric acid. The catalyst was then impregnated with 0.6% of its weight of additional tantalum oxide by immersion in a boiling solution containing about 3.5% of tantalum oxide and 10.0% of oxalic acid. The resultant product was then roasted at about 350° C.

Before the revivification treatment, the activity of the spent catalyst in producing butadiene by condensing acetaldehyde and ethanol was about 50% of the activity possessed by fresh catalyst under the same reaction conditions. After the foregoing treatment, the initial activity of the revivified catalyst was 109% of the initial activity of fresh catalyst. Moreover, after the revivified catalyst had been in service for 48 hours in the practice of the process, the revivified catalyst was found to have an activity 107% of that possessed by fresh catalyst after an operating period of similar length under identical conditions.

EXAMPLE II 330 grams of the air-reactivated spent butadiene catalyst described in Example I were immersed for one-half hour in distilled water, drained, and then immersed in 175 grams of an aqueous hydrofluoric acid solution containing 8.8% of hydrogen fluoride. After two hours the acid solution was decanted, and the catalyst was washed with distilled water in the manner described in Example I. The washed catalyst then was impregnated with 0.8% of its dry weight of additional tantalum oxide in the manner described in Example I, and the impregnated catalyst was roasted at around 350° C.

The initial activity of the thus revivified catalyst was 113% of that of fresh catalyst in the production of butadiene from ethanol and acetaldehyde conducted under identical conditions. After the revivified catalyst had been in use in the process for 48 hours the catalyst possessed an activity 106% of that of fresh catalyst after a similar operating period under identical conditions.

It will be understood that, while the examples refer to catalysts consisting of tantalum oxide deposited on silica gel, columbium oxide or zirconium oxide may be substituted for the tantalum oxide with generally similar results.

The invention is susceptible of modification within the scope of the appended claims.

I claim:

1. In the process for revivifying a spent catalyst comprising a silicious body promoted with at least one oxide of a metal selected from the group consisting of tantalum, zirconium and columbium, which catalyst is useful for condensing aliphatic aldehydes and alcohols to form diolefines, which process comprises eliminating at least the major portion of the carbonaceous impurities from the spent catalyst, thereby reactivating the catalyst, and thereafter impregnating the catalyst with an aqueous solution of a compound of a metal selected from the group consisting of tantalum, zirconium and columbium, which compound is decomposable to yield an oxide of such a metal, the steps which comprise reacting the reactivated catalyst with a dilute aqueous solution of hydrofluoric acid, and removing therefrom excess hydrofluoric acid and water-soluble reaction products prior to said impregnation step.

2. Process for revivifying a spent catalyst from which at least the major portion of carbonaceous impurities has been eliminated by ignition in an oxidizing atmosphere, said catalyst comprising a silicious body promoted with at least one oxide selected from the group consisting of the oxides of tantalum, zirconium and columbium, which catalyst is useful for condensing aliphatic aldehydes and alcohols to form diolefines, which comprises treating such spent catalyst with an aqueous solution of hydrogen fluoride, and contacting the thus-treated catalyst with an aqueous solution of a compound selected from the group consisting of compounds of tantalum, zirconium and columbium decomposable to yield the oxides of such metals.

3. Process for revivifying a spent catalyst from which at least the major portion of carbonaceous impurities has been eliminated by ignition in an oxidizing atmosphere, said catalyst comprising a silica gel promoted with at least one compound of the group consisting of the oxides of tantalum, zirconium and columbium, which catalyst is useful for condensing aliphatic aldehydes and alcohols to form diolefines, which comprises treating the spent catalyst with a dilute solution of hydrofluoric acid, whereby said acid and a part of the silicious body react to form hydrofluosilicic acid, removing excess acids and water-soluble reaction products, and impregnating the acid-treated catalyst with a small amount of a compound decomposable to form an oxide of a metal selected from the group consisting of tantalum, zirconium and columbium, thereby restoring the catalyst to a state of activity substantially greater than that possessed by the spent catalyst before treatment.

4. Process for revivifying a spent catalyst from which at least the major portion of carbonaceous impurities has been eliminated by ignition in an oxidizing atmosphere, said catalyst comprising a silica gel containing at least one compound of the group consisting of the oxides of tantalum, zirconium and columbium, and useful for condensing aldehydes with alcohols to form diolefines, which comprises mixing the spent catalyst with a dilute aqueous solution of hydrofluoric acid, whereby said acid and a part of the silicious material of the catalyst react to form hydrofluosilicic acid, removing excess acids from the catalyst to yield a product at least approximately free from hydrofluoric acid and hydrofluosilicic acid, and impregnating the acid-treated spent catalyst with a small amount of a compound decomposable to form an oxide of a metal selected from the group consisting of tantalum, zirconium and columbium.

5. Process as defined in claim 4 wherein the spent catalyst is treated with a dilute aqueous solution of hydrofluoric acid containing between about 1% and about 10% of hydrogen fluoride.

6. Process as defined in claim 4, together with a step of roasting the reimpregnated catalyst at a temperature within the range between about 250° C. and about 400° C.

7. Process as defined in claim 4 wherein the spent catalyst is first freed from carbonaceous materials by heating the spent catalyst in a stream of air at a temperature within the range between about 300° C. and about 500° C.

8. Process for revivifying a spent catalyst from which at least the major portion of carbonaceous impurities has been eliminated by ignition in an oxidizing atmosphere, said catalyst comprising a silica gel impregnated with a compound of the group consisting of the oxides of tantalum, zirconium and columbium and useful for dehydrating aldehydes and alcohols to form diolefines, which comprises treating the catalyst with a dilute aqueous solution of hydrofluoric acid containing between about 1% and about 10% of hydrogen fluoride, removing excess hydrofluoric acid together with hydrofluosilicic acid formed by the acid treatment, and impregnating the acid-treated catalyst with a compound decomposable to provide at least 0.1% of the weight of the catalyst of an additional fresh deposit of an oxide of a metal selected from the group consisting of tantalum, zirconium and columbium.

9. Process for revivifying a spent catalyst of the group consisting of the oxides of tantalum, zirconium and columbium, supported on silica gel, and useful for condensing aldehydes and alcohols to form diolefines, which comprises eliminating carbonaceous impurities from the spent catalyst at an elevated temperature within the range between about 300° C. and 500° C., thereafter treating the catalyst with a dilute aqueous solution of hydrofluoric acid containing between about 1% and about 10% of hydrogen fluoride, removing excess hydrofluoric acid together with hydrofluosilicic acid formed by the acid treatment, and impregnating the acid-treated catalyst with a compound decomposable to the oxide of a metal selected from the group consisting of tantalum, zirconium and columbium, to provide a revivified catalyst having between 0.5% and 10% of the oxide of such a metal, based upon the dry weight of the catalyst.

10. Process as defined in claim 9, which includes a final step of roasting the impregnated catalyst.

11. Process for revivifying a spent catalyst from which at least the major portion of carbonaceous impurities has been eliminated by ignition in an oxidizing atmosphere, said catalyst comprising silica gel containing a compound selected from the group consisting of the oxides of tantalum, zirconium and columbium, which catalyst is useful in condensing aliphatic aldehydes with alcohols to form diolefines, which comprises bringing the catalyst into contact with a dilute solution of hydrofluoric acid under conditions whereby a quantity of hydrogen fluoride amounting to about 5% of the weight of the dry silica gel reacts with the latter, removing from the catalyst excess of said acid and water-soluble products of the resultant reaction, and impregnating the acid-treated silica gel with a compound decomposable to the oxide of a metal selected from the group consisting of tantalum, zirconium and columbium to provide a silica gel containing between about 0.5% and 10% by weight of the oxide of such a metal.

DONALD R. JACKSON.

REFERENCES CITED

The following references are of record in the file of this patent:

UNITED STATES PATENTS

| Number | Name | Date |
|---|---|---|
| 2,246,900 | Schulze | June 24, 1941 |
| 2,271,618 | Block et al. | Feb. 3, 1942 |
| 2,333,500 | Welty | Nov. 2, 1943 |